(12) United States Patent
Moon

(10) Patent No.: US 12,741,818 B2
(45) Date of Patent: Sep. 22, 2026

(54) APPARATUS FOR AUTOMATED ASSEMBLING OF SUITCASE WHEELS AND HANDLES

(71) Applicant: MILAGROS INTERNATIONAL INC., Taipei City (TW)

(72) Inventor: Jerry Moon, Taipei City (TW)

(73) Assignee: MILAGROS INTERNATIONAL INC., Taipei City (TW)

( * ) Notice: Subject to any disclaimer, the term of this patent is extended or adjusted under 35 U.S.C. 154(b) by 249 days.

(21) Appl. No.: 18/787,601

(22) Filed: Jul. 29, 2024

(65) Prior Publication Data

US 2025/0388403 A1 Dec. 25, 2025

(30) Foreign Application Priority Data

Jun. 25, 2024 (TW) ................................ 113123620

(51) Int. Cl.

| | |
|---|---|
| ***A45C 5/03*** | (2006.01) |
| ***A45C 5/14*** | (2006.01) |
| ***A45C 13/26*** | (2006.01) |
| ***B65G 1/137*** | (2006.01) |

(52) U.S. Cl.
CPC .............. *B65G 1/1378* (2013.01); *A45C 5/03* (2013.01); *A45C 5/14* (2013.01); *A45C 13/262* (2013.01)

(58) Field of Classification Search
CPC ........... B65G 1/1378; A45C 5/03; A45C 5/14; A45C 13/262
See application file for complete search history.

(56) References Cited

U.S. PATENT DOCUMENTS

2019/0150605 A1 * 5/2019 Hu ........................ A46D 3/085

FOREIGN PATENT DOCUMENTS

| | | | |
|---|---|---|---|
| CN | 206356569 U * 7/2017 | | |
| CN | 209986486 U * 1/2020 | | |
| CN | 108903176 B * 10/2023 | .............. | A45C 5/04 |

* cited by examiner

*Primary Examiner* — Justin Holmes
(74) *Attorney, Agent, or Firm* — Rabin & Berdo, P.C

(57) ABSTRACT

Apparatus for automated assembling of suitcase wheels and handles includes a wheel pick-up arm for moving a wheel and a suitcase shell to a wheel conveyance platform near a wheel mounting mechanism, so that the handle is locked to the suitcase shell to form a half-finished suitcase shell; a handle pick-up arm and a suitcase shell pick-up arm for moving one handle and one half-finished suitcase shell, respectively, to a handle mounting table on a handle conveyance platform; and a mounting plate pick-up arm for placing a mounting plate on an inner side of the half-finished suitcase shell in alignment with the handle previously locked to an opposite side of the half-finished suitcase shell to produce a finished suitcase shell. With the above arrangements, it is able to reduce operating errors and operating time when assembling the handles and wheels to the suitcase shells.

10 Claims, 9 Drawing Sheets

APPARATUS FOR AUTOMATED ASSEMBLING OF SUITCASE WHEELS AND HANDLES

FIELD OF THE INVENTION

The present invention relates to apparatus for automated assembling of wheels and handles to a suitcase shell, and more particularly, to apparatus for automatically assembling wheels and handles to a suitcase shell to reduce operating errors that would otherwise happen in manual assembling and shorten the operating time required for assembling wheels and handles to the suitcase shell.

BACKGROUND OF THE INVENTION

A suitcase is generally carried by a user during a holiday trip or a sightseeing travel abroad for holding personal things. Presently, there are various kinds of suitcases available in the market featured by different functions and designs to satisfy users' increasing demands. Most of the currently commercially available suitcases usually consist of suitcase shells, wheels, and handles; and the wheels and handles are generally sequentially assembled manually to the suitcase shells to provide the finished products.

However, in the process of manually assembling the wheels and handles to the suitcase shells, a number of suitcase shells, wheels, handles, and locking tools are positioned at the working site of each operator to occupy a considerable large space and make the place a mess. Further, operators are different in experiences, the finished suitcase shells with the manually assembled wheels and handles are subjected to different assembling quality and accordingly, have safety concern in use of these suitcases.

SUMMARY OF THE INVENTION

A primary object of the present invention is to provide apparatus for automated assembling of suitcase wheels and handles, so as to effectively reduce the operating errors in the process of assembling wheels and handles to the suitcase shell.

Another object of the present invention is to provide apparatus for automated assembling of suitcase wheels and handles, with which a wheel is assembled to a piece of suitcase shell on a wheel mounting table while a piece of handle is assembled to another piece of suitcase shell on a handle mounting table, such that the operating time for assembling the wheels and the handles to the suitcase shells can be largely shortened.

To achieve the above and other object, the apparatus for automated assembling of suitcase wheels and handles according to the present invention includes a wheel processing device and a handle processing device.

The wheel processing device mainly includes a wheel conveyance platform, a wheel pick-up arm, and a wheel mounting mechanism. The wheel conveyance platform is turnable to and fro between a wheel placement position and a wheel locking position. The wheel pick-up arm can pick up one piece of wheel and one piece of suitcase shell, and placing the wheel and the suitcase shell sequentially on the wheel conveyance platform at the wheel placement position, so that the wheel and the suitcase shell can be moved by the wheel conveyance platform to the wheel locking position, at where the wheel mounting mechanism locks the wheel to the suitcase shell to form a half-finished suitcase shell.

The handle processing device includes a handle conveyance platform, a handle pick-up arm, a shell pick-up arm, a mounting plate pick-up arm, and a handle mounting mechanism. The handle conveyance platform is turnable to and fro among a handle placement position, a shell placement position, and a handle locking position. The handle pick-up arm picks up one piece of handle and places the handle on the handle conveyance platform at the handle placement position, so that the handle is moved by the handle conveyance platform to the shell placement position.

The shell pick-up arm is located between the shell placement position and the wheel locking position for moving the half-finished suitcase shell from the wheel locking position on the wheel conveyance platform to the shell placement position on the handle conveyance platform, and the half-finished suitcase shell and the handle are movable by the handle conveyance platform to the handle locking position at the same time.

The mounting plate pick-up arm moves a mounting plate to the handle locking position and places the mounting plate on an inner side of the half-finished suitcase shell, so that the handle and the mounting plate are located at two opposite sides of the half-finished suitcase shell and aligned with each other. The handle mounting mechanism locks the handle and the mounting plate located at the handle locking position to the half-finished suitcase shell to produce a finished suitcase shell.

In a preferred embodiment, the wheel processing device further includes a wheel storage mechanism located to one side of the wheel pick-up arm; the wheel storage mechanism includes a wheel storage container for storing a plurality of wheels and a wheel conveyance rail connected to the wheel storage container; and the wheel storage container is capable of moving the wheels to the wheel conveyance rail. The wheel conveyance rail includes an inclined supporting board and an abutting board located perpendicular to the supporting board; and the wheel storage mechanism further includes a vibrator mounted in the wheel storage container for driving the wheels to vibrate on the wheel conveyance rail, such that the wheels move along the wheel conveyance rail at the same time with a wheel body of the wheels located between the supporting board and the abutting board and a mount portion of the wheels rest on the supporting board.

Further, the wheel conveyance platform includes a wheel mounting table and a wheel rotating table turnably assembled to the wheel mounting table. Two wheel positioning dies are provided on the wheel rotating table to hold one wheel in place on the wheel rotating table; and the wheel rotating table is turnable relative to the wheel mounting table to move one of the wheel positioning dies to the wheel placement position, while the other of the wheel positioning die is moved to the wheel locking position at the same time.

The handle conveyance platform includes a handle mounting table and a handle rotating table turnably assembled to the handle mounting table; a plurality of handle positioning dies are provided on the handle rotating table to hold one handle in place on the handle rotating table; and the handle rotating table is turnable relative to the handle mounting table to move one of the handle positioning dies to the handle placement position, while the other two handle positioning dies are moved to the shell placement position and the handle locking position, respectively.

The handle processing device further includes a mounting plate storage mechanism located to one side of the mounting plate pick-up arm; the mounting plate storage mechanism includes a mounting plate storage container for storing a plurality of mounting plates and a mounting plate conveyance rail connected to the mounting plate storage container; and the mounting plate storage container is capable of moving the mounting plates to the mounting plate conveyance rail, and the mounting plate conveyance rail further conveys the mounting plates to a position close to the mounting plate pick-up arm.

In the course both the wheel and the suitcase shell on the wheel conveyance platform are moved to the wheel locking position, the wheel pick-up arm also moves another wheel and another suitcase shell to the wheel placement position on the wheel conveyance platform, such that there is a plurality of wheels and suitcase shells positioned on the wheel conveyance platform at the same time.

When the shell pick-up arm has moved the half-finished suitcase shell from the wheel locking position to the shell placement position, the wheel conveyance platform also moves another wheel and another suitcase shell to the wheel locking position for the wheel mounting mechanism to lock the other wheel to the other suitcase shell to form another half-finished suitcase shell.

In the course the handle conveyance platform is moving the handle to the shell placement position, the handle pick-up arm also moves another handle to the handle placement position, such that there is a plurality of handles positioned on the handle conveyance platform.

When the handle conveyance platform is moving one handle and one half-finished suitcase shell to the handle locking position, the handle conveyance platform also moves another handle to the shell placement position and the shell pick-up arm also moves another half-finished suitcase shell to the shell placement position.

The apparatus for automated assembling of suitcase wheels and handles of the present invention is characterized in including a wheel processing device and a handle processing device. When the wheel processing device assembles the wheel to a suitcase shell automatically, the suitcase handle processing device also assembles the handle to the suitcase shell automatically. Therefore, it is able to effectively reduce the operating errors when assembling the wheels and the handles to the suitcase shells.

In the course the wheel conveyance platform, the wheel pick-up arm, and the wheel mounting mechanism of the wheel processing device work corporately to assembly a wheel to the suitcase shell, the handle conveyance platform, the handle pick-up arm, the shell pick-up arm, the mounting plate pick-up arm, and the handle mounting mechanism of the handle processing device also work corporately to assemble a handle to another suitcase shell at the same time. Therefore, the operating time for assembling the wheels and handles to the suitcase shells can be largely reduced.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
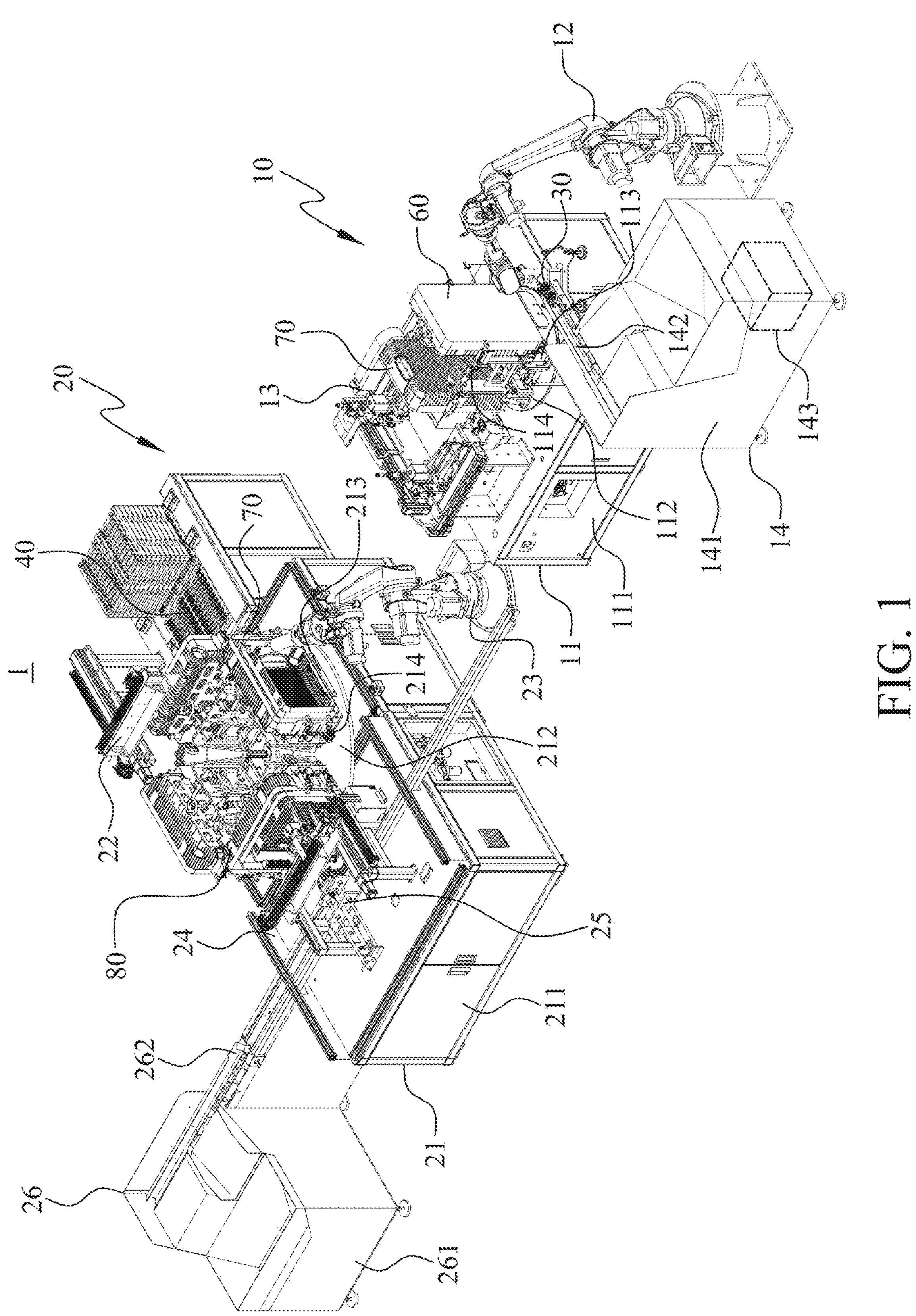
FIG. 1 is a perspective view of the apparatus for automated assembling of suitcase wheels and handles according to a preferred embodiment of the present invention.
Figure 2:
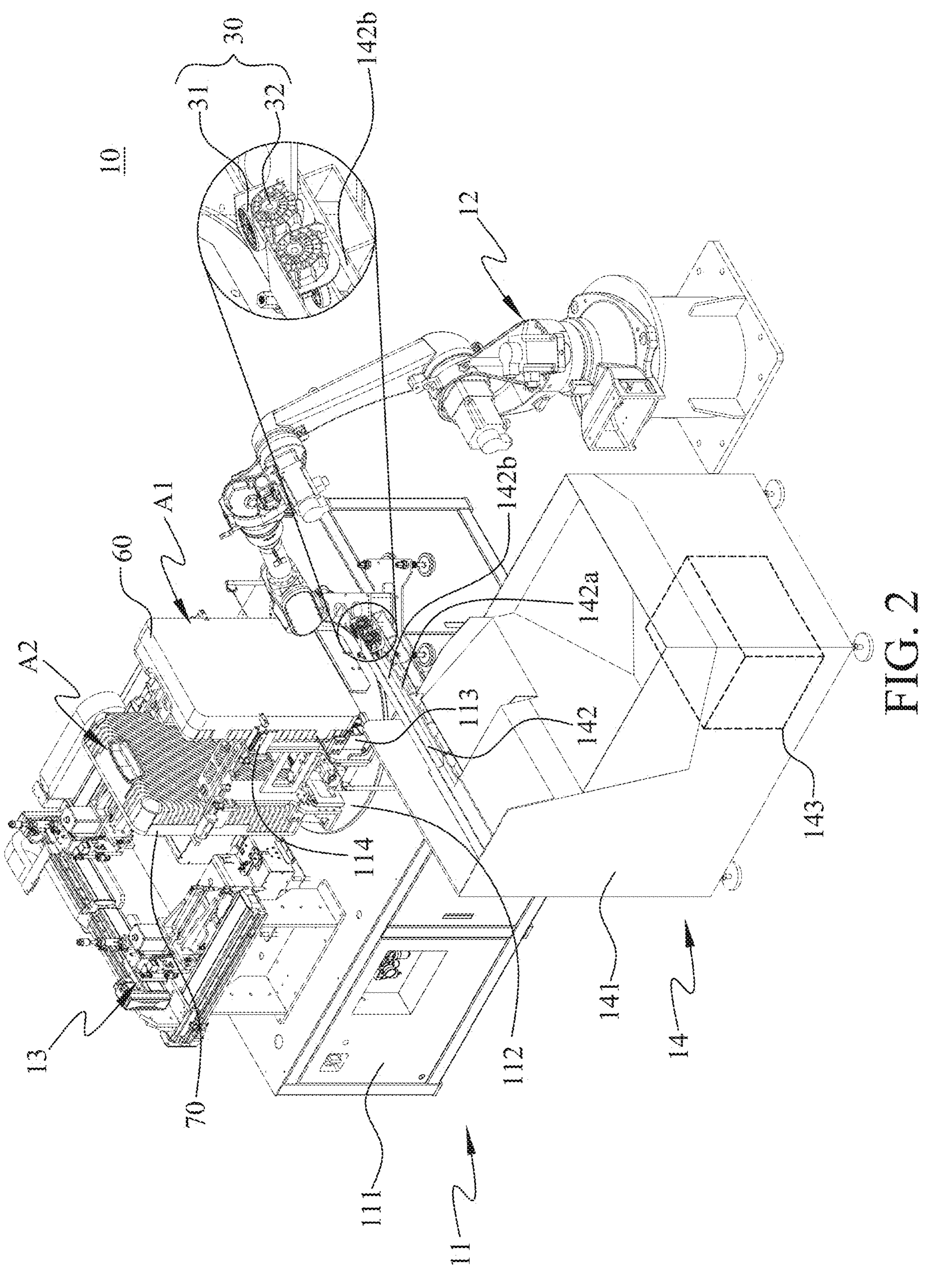
FIG. 2 is a perspective view of a wheel processing device included in the apparatus of the present invention.
Figure 3:
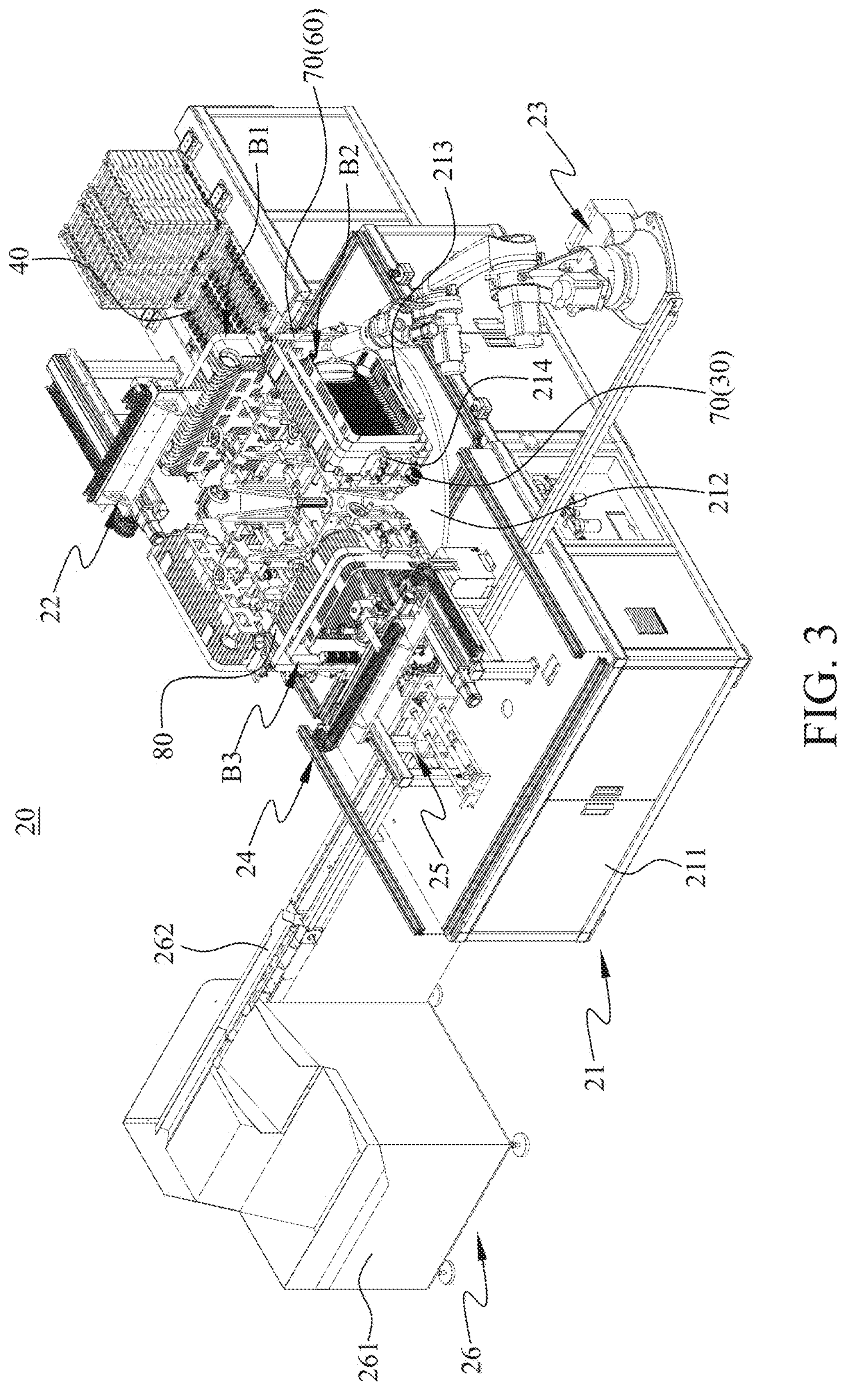
FIG. 3 is a perspective view of a handle processing device included in the apparatus of the present invention.

Please refer to FIGS. 1 to 3. For the purpose of conciseness and clarity, apparatus for automated assembling of suitcase wheels and handles according to the present invention is herein also briefly referred to as the apparatus and generally denoted by reference numeral 1. As shown, the apparatus 1 mainly includes a wheel processing device 10 and a handle processing device 20. Please refer to FIGS. 1 and 2. The wheel processing device 10 includes a wheel conveyance platform 11, a wheel pick-up arm 12, a wheel mounting mechanism 13, and a wheel storage mechanism 14. The wheel conveyance platform 11 includes a wheel mounting table 111 positioned on a ground and a wheel rotating table 112 rotatably connected to the wheel mounting table 111. The wheel rotating table 112 is rotatable relative to the wheel mounting table 111, such that the wheel rotating table 112 repeatedly turns to and fro between a wheel placement position A1 and a wheel locking position A2. And, the wheel rotating table 112 has two wheel positioning dies 113 and two shell clampers 114 mounted thereon. One of the wheel positioning dies 113 and one of the shell clampers 114 are located at a 90-degree position on the wheel rotating table 112, while the other wheel positioning die 113 and the other shell clamper 114 are located at a 270-degree position on the wheel rotating table 112. When the wheel rotating table 112 rotates relative to the wheel mounting table 111, it turns one of the wheel positioning dies 113 and one of the shell clampers 114 to the wheel placement position A1 and turns the other wheel positioning die 113 and the other shell clamper 114 to the wheel locking position A2.

As shown in FIGS. 1 and 2, the wheel pick-up arm 12 is located to one side of the wheel mounting table 111 of the wheel conveyance platform 11 closer to the wheel placement position A1; the wheel mounting mechanism 13 is connected to the wheel mounting table 111 of the wheel conveyance platform 11 closer to the wheel locking position A2; and the wheel storage mechanism 14 is located to one side of the wheel pick-up arm 12. The wheel storage mechanism 14 includes a wheel storage container 141 for storing a plurality of wheels 30 therein and a wheel conveyance rail 142 located between the wheel storage container 141 and the wheel pick-up arm 12. The wheel storage container 141 has a vibrator 143 mounted therein for producing vibration. The wheel conveyance rail 142 includes an inclined supporting board 142*a* and an abutting board 142*b* arranged perpendicular to the supporting board 142*a*.

Please refer to FIGS. 1 and 3. The handle processing device 20 is located to one side of the wheel processing device 10 and mainly includes a handle conveyance platform 21, a handle pick-up arm 22, a shell pick-up arm 23, a mounting plate pick-up arm 24, a handle mounting mechanism 25, and a mounting plate storage mechanism 26. The handle conveyance platform 21 is located to one side of the wheel conveyance platform 11 and includes a handle mounting table 211 positioned on the ground and a handle rotating table 212 rotatably connected to the handle mounting table 211. The handle mounting table 211 has a plurality of handles 40 stacked thereon and the handle rotating table 212 is rotatable relative to the handle mounting table 211, such that the handle rotating table 212 can repeatedly turn to and fro between a handle placement position B1, a shell placement position B2, and a handle locking position B3. The handle rotating table 212 has four handle positioning dies 213 and four auxiliary shell clampers 214 mounted thereon. The four handle positioning dies 213 are located at a 0-degree position, a 90-degree position, a 180-degree position, and a 270-degree position on the handle rotating table 212, respectively; and the four auxiliary shell clampers 214 are also located at the 0-degree position, the 90-degree position, the 180-degree position, and the 270-degree position on the handle rotating table 212, respectively. Thus, when the handle rotating table 212 rotates relative to the handle mounting table 211 and brings one of the handle positioning dies 213 and one of the auxiliary shell clampers 214 to the handle placement position B1, the remaining handle positioning dies 213 and auxiliary shell clampers 214 are brought by the rotating handle rotating table 212 to the shell placement position B2 and the handle locking position B3.

As shown in FIGS. 1 and 3, the handle pick-up arm 22 is connected to the handle mounting table 211 of the handle conveyance platform 21 and is located adjacent to the handle placement position B1. The shell pick-up arm 23 is located in the vicinity of the shell placement position B2 between the handle mounting table 211 of the handle conveyance platform 21 and the wheel mounting table 111 of the wheel conveyance platform 11. The mounting plate pick-up arm 24 and the handle mounting mechanism 25 are connected to the handle mounting table 211 and located close to the handle locking position B3. The mounting plate storage mechanism 26 is located to one side of the mounting plate pick-up arm 24 and includes a mounting plate storage container 261 for storing a plurality of mounting plates 50 therein and a mounting plate conveyance rail 262 located between the mounting plate storage container 261 and the mounting plate pick-up arm 24.

Figure 4A:
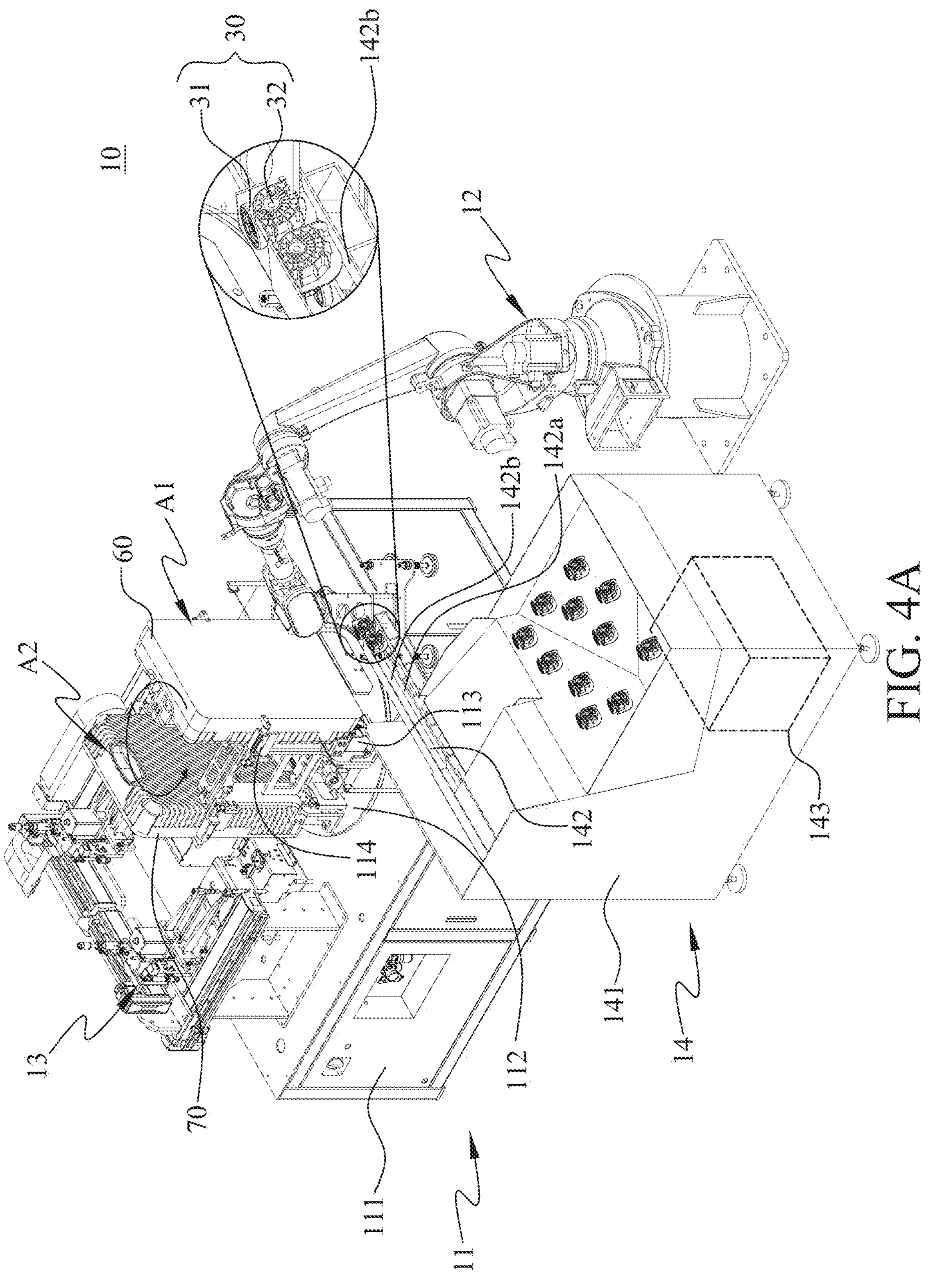
FIGS. 4A to 4C show how the wheel processing device assembles a wheel to a suitcase shell.
Figure 4B:
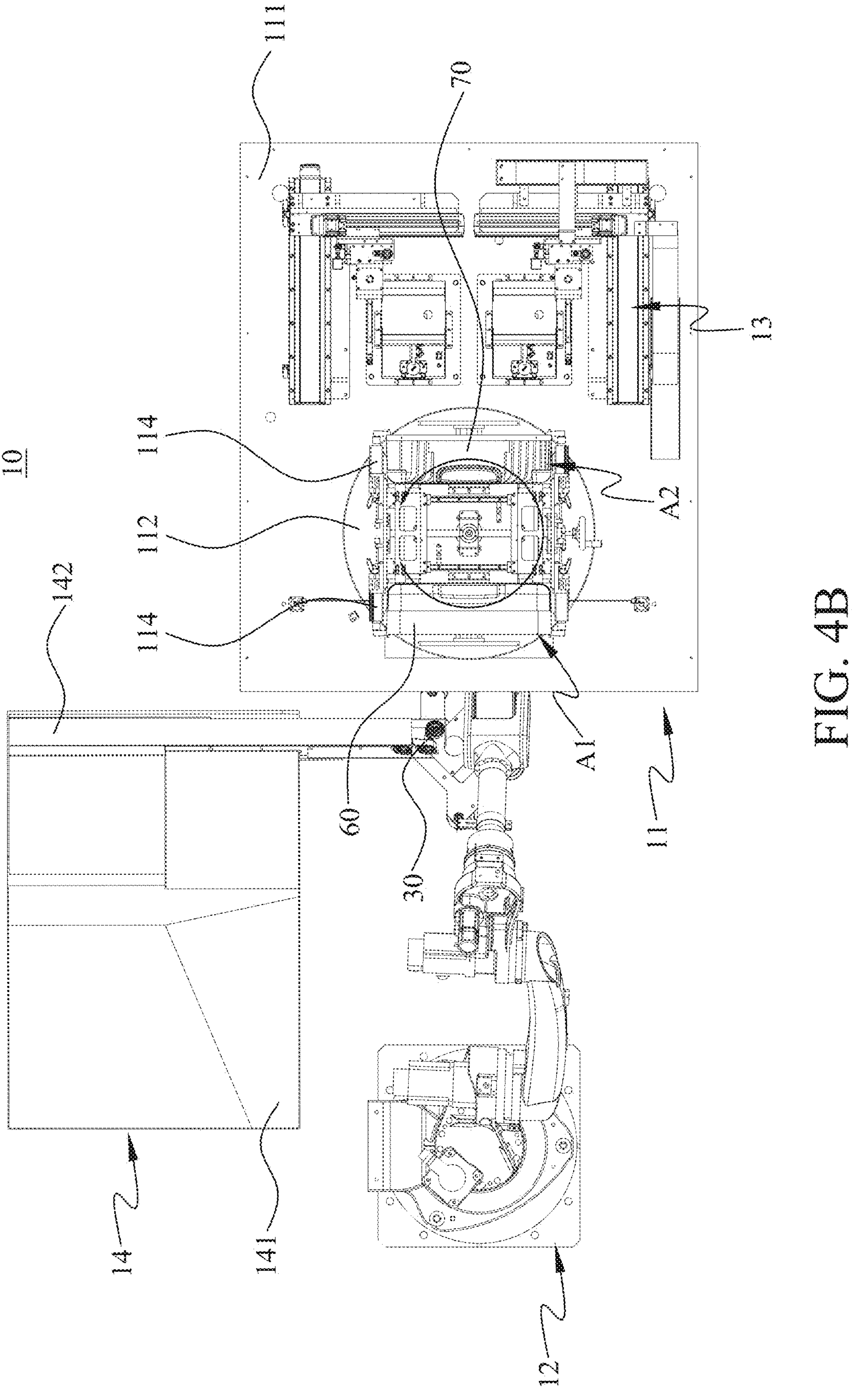
Figure 4C:
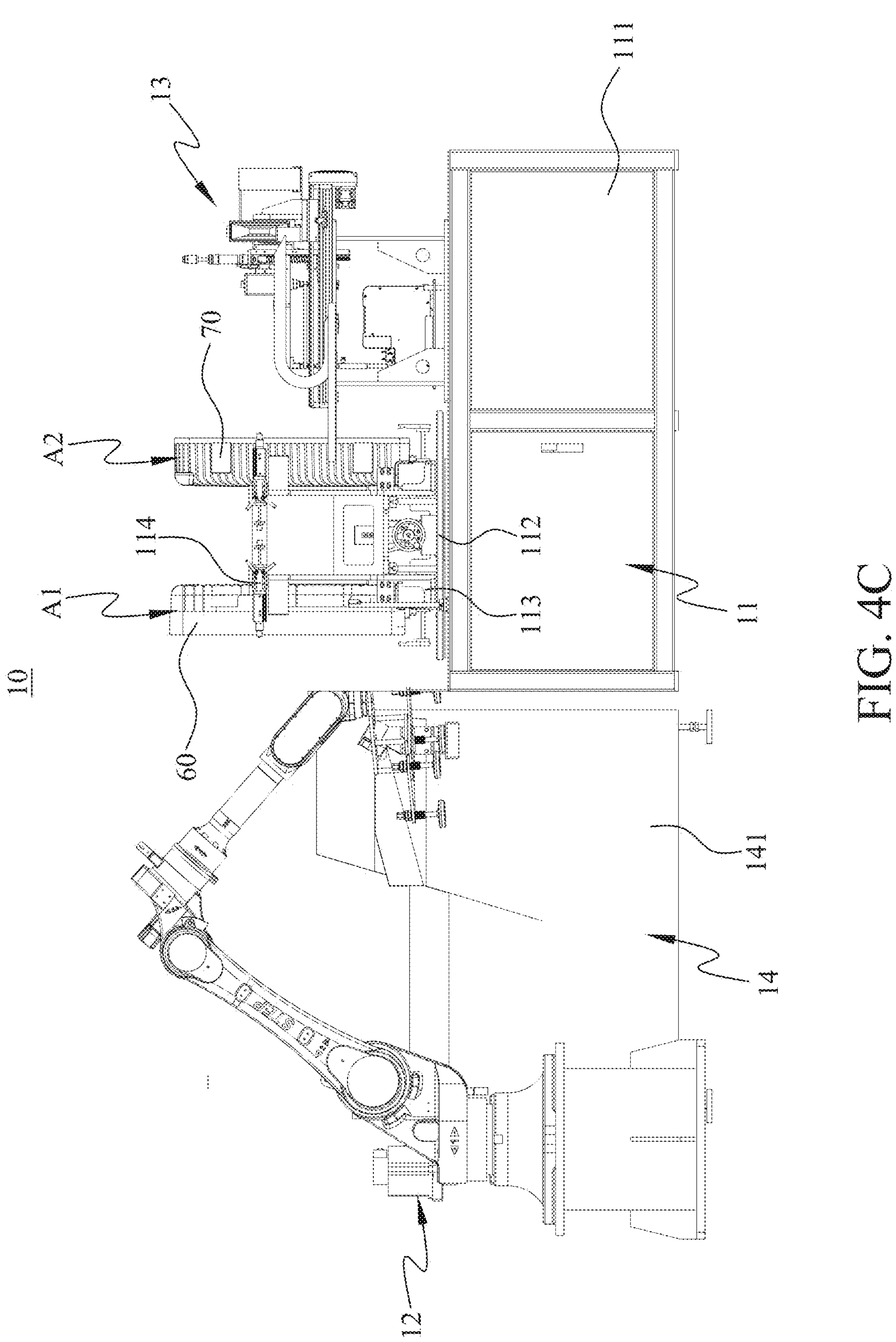

Please refer to FIGS. 4A, 4B and 4C, which illustrate the practical operation of the wheel processing device 10 to assemble the wheel 30 to a suitcase shell 60. First, the wheel storage container 141 of the wheel storage mechanism 14 carries the wheels 30 to the wheel conveyance rail 142. Then, the vibrator 143 of the wheel storage mechanism 14 is actuated to vibrate and accordingly, drive the wheels 30 on the wheel conveyance rail 142 to vibrate, such that a wheel body 31 of each of the wheels 30 is moved to a location between the supporting board 142*a* and the abutting board 142*b* of the wheel conveyance rail 142, while a mount portion 32 of the wheel 30 is rest on the supporting board 142*a*. The wheels 30 driven by the vibrator 143 to vibrate on the wheel conveyance rail 142 move gradually along the wheel conveyance rail 142 to a position close to the wheel pick-up arm 12.

Then, the wheel pick-up arm 12 picks up one of the wheels 30 from the wheel conveyance rail 142 of the wheel storage mechanism 14 and places the wheel 30 on the wheel placement position A1 of the wheel rotating table 112, so that the wheel 30 is set in one of the wheel positioning dies 113 on the wheel conveyance platform 11. Thereafter, the wheel pick-up arm 12 places one piece of suitcase shell 60 on the wheel rotating table 112 at the wheel placement position A1, such that the suitcase shell 60 is pushed against the mount portions 32 of the wheels 30. At this point, the wheel 30 and the suitcase shell 60 are sequentially positioned by the wheel pick-up arm 12 on the wheel rotating table 112 at the wheel placement position A1 of the wheel conveyance platform 11. When both the wheel 30 and the suitcase shell 60 are located on the wheel rotating table 112, the suitcase shell 60 is clamped by one of the shell clampers 114 on the wheel conveyance platform 11. Then, the wheel rotating table 112 is actuated to rotate relative to the wheel mounting table 111 of the wheel conveyance platform 11 and accordingly, moves the wheel 30 and the suitcase shell 60 to the wheel locking position A2, at where the wheel mounting mechanism 13 locks the wheel 30 to the suitcase shell 60 to form a half-finished suitcase shell 70. In the illustrated preferred embodiment, in the course the wheel rotating table 112 is moving one wheel 30 and one suitcase shell 60 to the wheel locking position A2, the wheel rotating table 112 also moves another wheel positioning die 113 to the wheel placement position A1 and the wheel pick-up arm 12 moves another wheel 30 and another suitcase shell 60 to the wheel placement position A1 at the same time. Therefore, the other suitcase shell 60 is clamped in place by another shell clamper 114. Therefore, there is a plurality of wheels 30 and a plurality of suitcase shells 60 positioned on the wheel rotating table 112 at the same time.

Figure 5A:
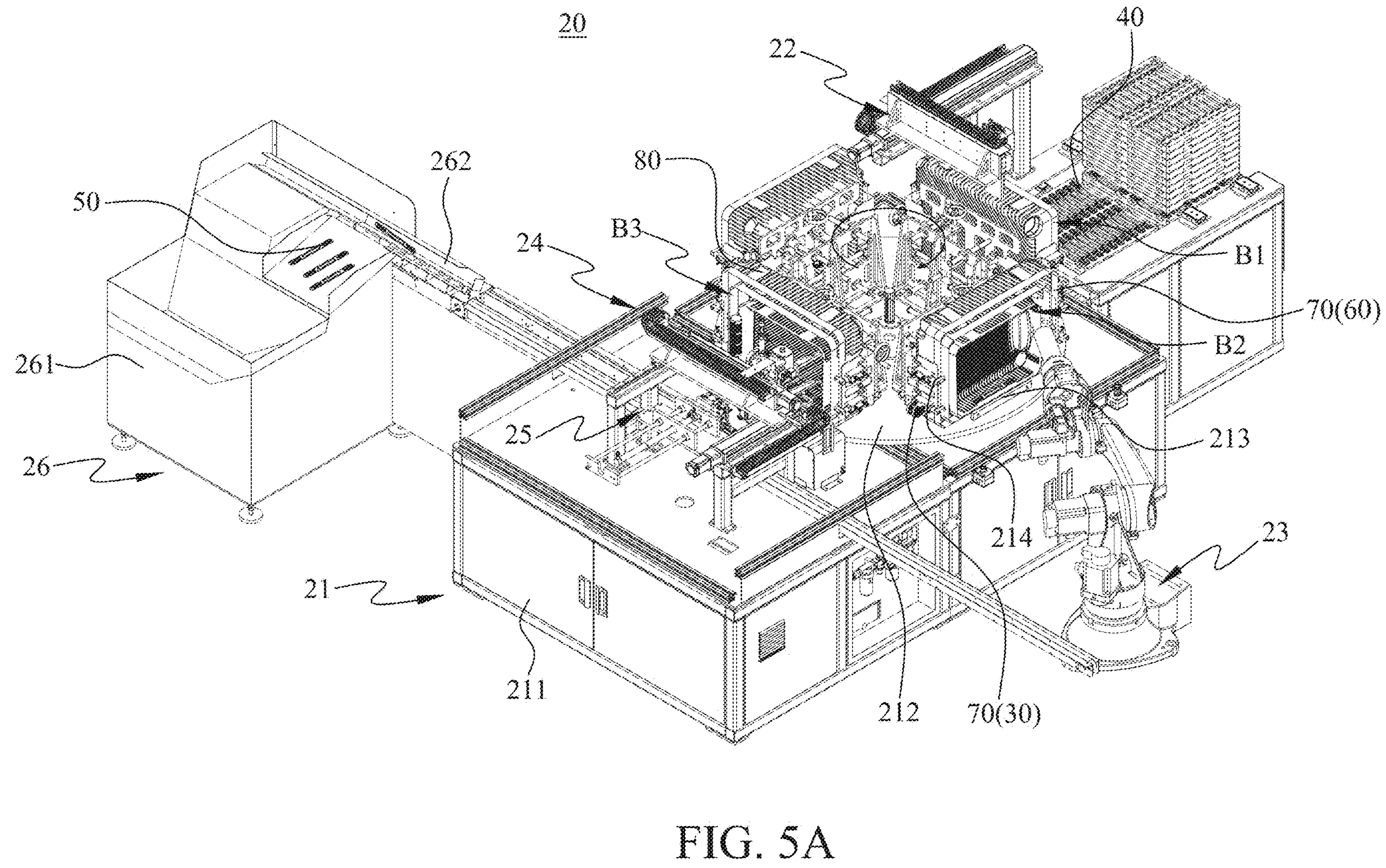
FIGS. 5A to 5C show how the handle processing device assembles a handle to the suitcase shell.
Figure 5B:
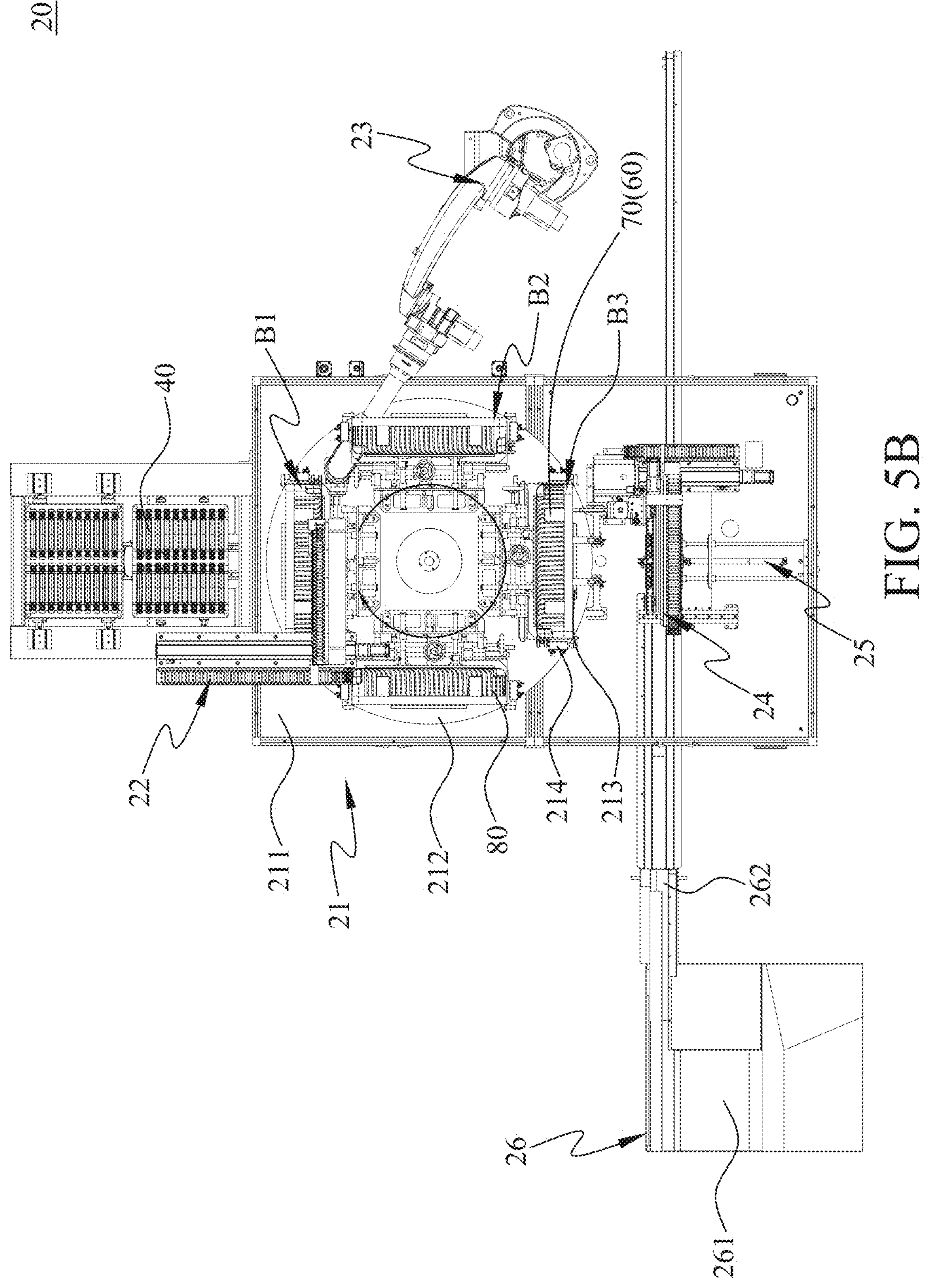
Figure 5C:
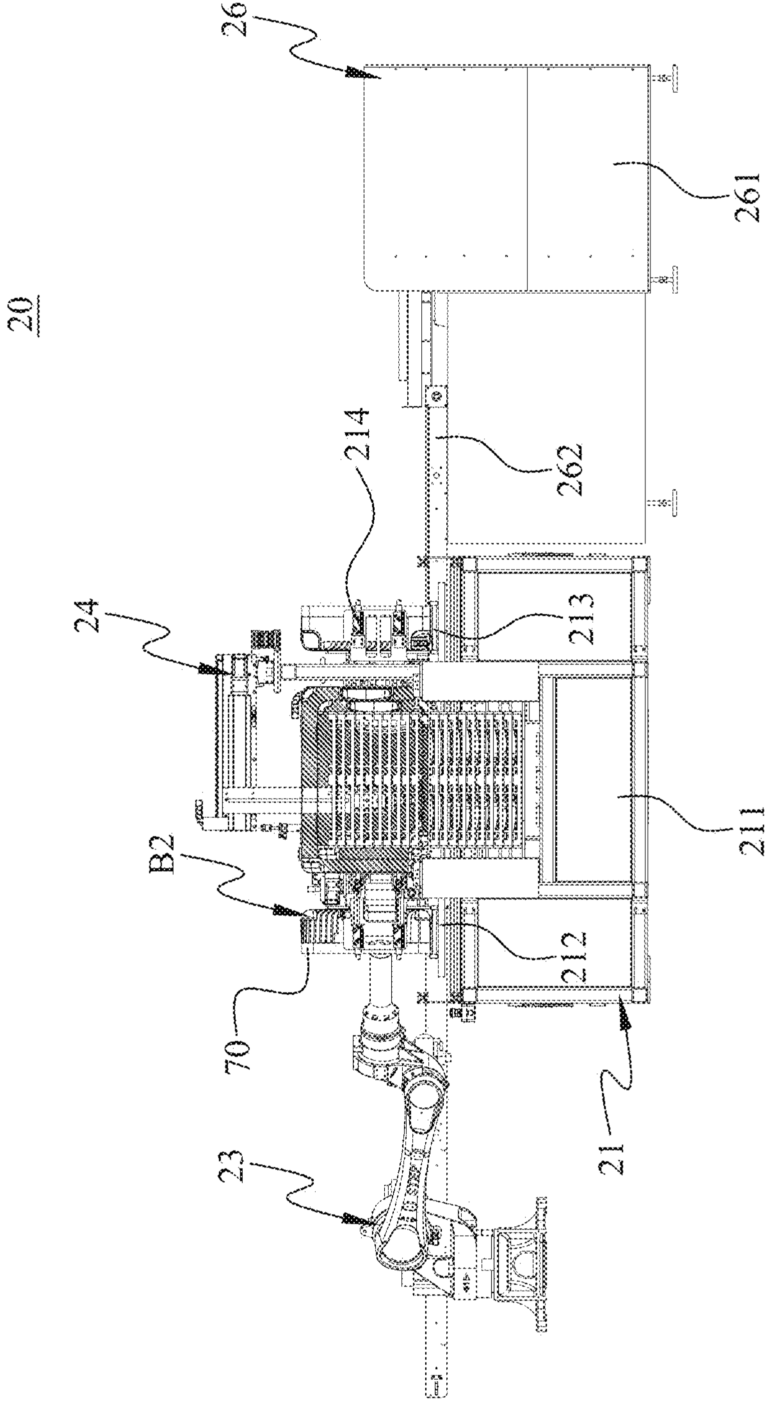

Please refer to FIGS. 5A to 5C, which illustrate the practical operation of the handle processing device 20 to assemble the handle 40 and the mounting plate 50 to the half-finished suitcase shell 70. First, the handle pick-up arm 22 of the handle processing device 20 picks up one piece of the handles 40 and places the handle 40 on the handle rotating table 212 at the handle placement position B1, so that the handle 40 is set in one of the handle positioning dies 213 of the handle conveyance platform 21. Then, the handle 40 is moved by the handle rotating table 212 of the handle conveyance platform 21 from the handle placement position B1 to the shell placement position B2. In the illustrated preferred embodiment, in the course the handle rotating table 212 moves the handle 40 to the shell placement position B2, the handle rotating table 212 also moves another handle positioning die 213 to the handle placement position B1, and the handle pick-up arm 212 moves another handle 40 to the handle positioning die 213 at the handle placement position B1. Therefore, there is a plurality of handles 40 placed on the handle rotating table 212 at the same time. Further, the mounting plate storage container 261 of the mounting plate storage mechanism 26 moves the mounting plates 50 to the mounting plate conveyance rail 262, so that the mounting plates 50 can move along the mounting plate conveyance rail 262 of the mounting plate storage mechanism 26 to the mounting plate pick-up arm 24 gradually.

When the handle rotating table 212 of the handle conveyance platform 21 brings the handle 40 to the shell placement position B2, the shell pick-up arm 23 also moves the half-finished suitcase shell 70 from the wheel locking position A2 of the wheel rotating table 112 to the shell placement position B2, so that the half-finished suitcase shell 70 is located above the handle 40 and clamped in place by the auxiliary shell clampers 214. In the illustrated preferred embodiment, when the shell pick-up arm 23 has moved one piece of the half-finished suitcase shell 70 from the wheel locking position A2 to the shell placement position B2, the wheel rotating table 112 of the wheel conveyance platform 11 also moves another wheel 30 and another suitcase shell 60 to the wheel locking position A2, so that the wheel mounting mechanism 13 can lock the other wheel 30 to the other suitcase shell 60 to form another half-finished suitcase shell 70.

Then, the handle rotating table 212 of the handle conveyance platform 21 rotates and brings the handle 40 and the half-finished suitcase shell 70 to the handle locking position B3, and the mounting plate pick-up arm 24 moves one piece of the mounting plates 50 from the mounting plate conveyance rail 262 of the mounting plate storage mechanism 26 to the handle locking position B3 of the handle rotating table 212, such that the mounting plate 50 is placed on an inner side of the half-finished suitcase shell 70. Thereafter, the handle 40 and the mounting plate 50 located at two opposite sides of the half-finished suitcase shell 70 are aligned with each other, and the handle mounting mechanism 25 locks the aligned handle 40 and mounting plate 50 to the half-finished suitcase shell 70 to form a finished suitcase shell 80. In the illustrated preferred embodiment, when the handle conveyance platform 21 brings one handle 40 and one half-finished suitcase shell 70 to the handle locking position B3, the handle conveyance platform 21 also brings another handle 40 and another half-finished suitcase shell 70 to the shell placement position B2.

The present invention has been described with a preferred embodiment thereof and it is understood that many changes and modifications in the described embodiment can be carried out without departing from the scope and the spirit of the invention that is intended to be limited only by the appended claims.

What is claimed is:

1. Apparatus for automated assembling of suitcase wheels and handles, comprising:

- a wheel processing device including:
  - a wheel conveyance platform turnable to and fro between a wheel placement position and a wheel locking position;
  - a wheel pick-up arm for picking up one piece of wheel and one piece of suitcase shell, and placing the wheel and the suitcase shell sequentially on the wheel conveyance platform at the wheel placement position, so that the wheel and the suitcase shell are then moved by the wheel conveyance platform to the wheel locking position; and
  - a wheel mounting mechanism for locking the wheel to the suitcase shell at the wheel locking position to form a half-finished suitcase shell; and
- a handle processing device including
  - a handle conveyance platform being turnable to and fro among a handle placement position, a shell placement position, and a handle locking position;
  - a handle pick-up arm for picking up one piece of handle and placing the handle on the handle conveyance platform at the handle placement position, so that the handle is movable by the handle conveyance platform to the shell placement position;
  - a shell pick-up arm located between the shell placement position and the wheel locking position for moving the half-finished suitcase shell from the wheel locking position on the wheel conveyance platform to the shell placement position on the handle conveyance platform, and the half-finished suitcase shell and the handle being movable by the handle conveyance platform to the handle locking position at the same time;
  - a mounting plate pick-up arm for moving a mounting plate to the handle locking position and placing the mounting plate on an inner side of the half-finished suitcase shell, so that the handle and the mounting plate are located at two opposite sides of the half-finished suitcase shell and aligned with each other; and
  - a handle mounting mechanism for locking the handle and the mounting plate located at the handle locking position to the half-finished suitcase shell to produce a finished suitcase shell.

2. The apparatus for automated assembling of suitcase wheels and handles as claimed in claim 1, wherein the wheel processing device further includes a wheel storage mechanism located to one side of the wheel pick-up arm; the wheel storage mechanism including a wheel storage container for storing a plurality of wheels and a wheel conveyance rail connected to the wheel storage container; and the wheel storage container being capable of moving the wheels to the wheel conveyance rail.

3. The apparatus for automated assembling of suitcase wheels and handles as claimed in claim 2, wherein the wheel conveyance rail includes an inclined supporting board and an abutting board located perpendicular to the supporting board; the wheel storage mechanism further including a vibrator mounted in the wheel storage container for driving the wheels to vibrate on the wheel conveyance rail, such that the wheels move along the conveyance rail at the same time with a wheel body of the wheels located between the supporting board and the abutting board and a mount portion of the wheelsrest on the supporting board.

4. The apparatus for automated assembling of suitcase wheels and handles as claimed in claim 1, wherein the wheel conveyance platform includes a wheel mounting table and a wheel rotating table turnably assembled to the wheel mounting table; two wheel positioning dies are provided on the wheel rotating table to hold one wheel in place on the wheel rotating table; the wheel rotating table being turnable relative to the wheel mounting table to move one of the wheel positioning dies to the wheel placement position, while the other of the wheel positioning die is moved to the wheel locking position at the same time.

5. The apparatus for automated assembling of suitcase wheels and handles as claimed in claim 1, wherein the handle conveyance platform includes a handle mounting table and a handle rotating table turnably assembled to the handle mounting table; a plurality of handle positioning dies are provided on the handle rotating table to hold one handle in place on the handle rotating table; the handle rotating table being turnable relative to the handle mounting table to move one of the handle positioning dies to the handle placement position, while the others of the handle positioning dies are moved to the shell placement position and the handle locking position, respectively.

6. The apparatus for automated assembling of suitcase wheels and handles as claimed in claim 1, wherein the handle processing device further includes a mounting plate storage mechanism located to one side of the mounting plate pick-up arm; the mounting plate storage mechanism including a mounting plate storage container for storing a plurality of mounting plates and a mounting plate conveyance rail connected to the mounting plate storage container; and the mounting plate storage container being capable of moving the mounting plates to the mounting plate conveyance rail, and the mounting plate conveyance rail further conveys the mounting plates to a position close to the mounting plate pick-up arm.

7. The apparatus for automated assembling of suitcase wheels and handles as claimed in claim 1, wherein, in the course both the wheel and the suitcase shell on the wheel conveyance platform are moved to the wheel locking position, the wheel pick-up arm also moves another wheel and another suitcase shell to the wheel placement position on the wheel conveyance platform, such that there is a plurality of wheels and suitcase shells positioned on the wheel conveyance platform at the same time.

8. The apparatus for automated assembling of suitcase wheels and handles as claimed in claim 7, wherein, when the shell pick-up arm has moved the half-finished suitcase shell from the wheel locking position to the shell placement position, the wheel conveyance platform also moves another wheel and another suitcase shell to the wheel locking position for the wheel mounting mechanism to lock the other wheel to the other suitcase shell to form another half-finished suitcase shell.

9. The apparatus for automated assembling of suitcase wheels and handles as claimed in claim 8, wherein, in the course the handle conveyance platform is moving the handle to the shell placement position, the handle pick-up arm also moves another handle to the handle placement position, such that there is a plurality of handles positioned on the handle conveyance platform.

10. The apparatus for automated assembling of suitcase wheels and handles as claimed in claim 9, wherein, when the handle conveyance platform is moving one handle and one half-finished suitcase shell to the handle locking position, the handle conveyance platform also moves another handle to the shell placement position and the shell pick-up arm also moves another half-finished suitcase shell to the shell placement position.

* * * * *